United States Patent [19]

Takizawa et al.

[11] 3,897,466
[45] July 29, 1975

[54] METHOD OF PREPARING N$^\omega$-ACYL BASIC AMINO ACIDS

[75] Inventors: Koichi Takizawa, Yokohama; Ryonosuke Yoshida, Kamakura, both of Japan

[73] Assignee: Ajinomoto Co., Inc., Tokyo, Japan

[22] Filed: Apr. 23, 1973

[21] Appl. No.: 353,634

[30] Foreign Application Priority Data
Apr. 25, 1972    Japan.................................. 47-41912

[52] U.S. Cl. ....... 260/404.5; 260/518 R; 260/534 E; 260/534 L; 260/534 R
[51] Int. Cl. ........................................... C07c 103/30
[58] Field of Search .......... 260/518 R, 404.5, 534 L

[56] References Cited
UNITED STATES PATENTS

| | | | |
|---|---|---|---|
| 2,071,253 | 2/1937 | Carothers ........................ | 260/404.5 |
| 2,277,152 | 3/1942 | Schlack............................ | 260/404.5 |
| 2,466,854 | 4/1949 | Koch................................... | 260/78 |
| 2,519,038 | 8/1950 | Galat................................. | 260/534 L |
| 2,731,480 | 1/1956 | Kruckenberg.................... | 260/534 L |
| 3,024,272 | 3/1962 | Hyson et al. .................... | 260/534 L |
| 3,265,682 | 8/1966 | Gloor et al..................... | 260/404.5 X |
| 3,651,138 | 3/1972 | Yee et al......................... | 260/534 L |

FOREIGN PATENTS OR APPLICATIONS 11,385   1/1956   Germany......................... 260/534 L

OTHER PUBLICATIONS

C.A. 68: 105504z.
Bodanszky et al., Peptide Synthesis, pg. 42, Interscience Monographs on Chemistry, 1966.

*Primary Examiner*—Lewis Gotts
*Assistant Examiner*—Ethel G. Love
*Attorney, Agent, or Firm*—Hans Berman; Kurt Kelman

[57] ABSTRACT

An N$^\omega$-acyl derivative of a basic amino acid is obtained in high yield by holding the salt of the amino acid with the carboxylic acid intended to furnish the acyl group at 100° to 250°C.

9 Claims, No Drawings

METHOD OF PREPARING N OMEGA-ACYL BASIC AMINO ACIDS

This invention relates to the acylation of amino acids, and particularly to a method of preparing $N^\omega$-acyl derivatives of basic amino acids.

The $N^\omega$-acyl basic amino acids are important intermediates in the synthesis of other compounds. When the acyl group is derived from an aliphatic carboxylic acid having a carbon chain of eight to 22 members, the N-acyl derivative may be used as an amphoteric surfactant in detergents, flotation liquors, textile treating compositions, and the like.

It is common practice to convert amino acids to their N-acyl derivatives by reaction with acyl halides in aqueous, alkaline media. A basic amino acid, however, has two amino groups in positions $\alpha$ and $\omega$, and the use of acyl chlorides mainly produces the N,N'-diacyl derivative. It has therefore been proposed (Yakugaku Zasshi, Japan, 89 [1969] 531) to convert the basic amino acid to its copper salt, and to acylate the copper salt to the copper salt of the $N^\omega$-acylamino acid. The latter can then be decomposed by means of hydrogen sulfide. The procedure is relatively complex and costly.

It has also been proposed to prepare an N-acylamino acid by heating an amino acid with a carboxylic acid, its ester or amide, and an equivalent amount of acid acceptor at 100° to 250°C (Japanese Patent Application No. 3538/1971, laid open on Sept. 2, 1971, No. 709/1971). It has been found, however, that this method, while successful in producing N-acylated neutral amino acids, gives very poor yields of the $N^\varsigma$-acyl derivatives when applied to basic amino acids.

It has now been found that the $N^\omega$-acyl derivatives of the basic amino acids are produced in very high yields when the amino acids are first converted to the salts of the carboxylic acids from which the acyl group is to be derived, and the salts so obtained are held at 100° – 250°C until the desired result is achieved and a corresponding amount of water is released.

The basic amino acids readily form salts with carboxylic acids in aqueous media, and the salts may be recovered by conventional methods. The basic amino acids in which the amino groups outnumber the carboxyl group, and which are suitable for performing the method of the invention include the $\alpha,\omega$-diaminomonocarboxylic acids such as lysine, ornithine, and $\alpha,\gamma$-diaminobutyric acid, and also their $N^\alpha$-lower alkyl derivatives, of which those having one to four carbon atoms in the lower-alkyl group have greatest practical significance. $N^\alpha$-Methyllysine, $N^\alpha$, $N^\alpha$-dimethyllysine, and $N^\alpha$, $N^\alpha$-dimethylornithine are typical of this group.

The basic amino acids form salts suitable for conversion according to this invention with a wide variety of carboxylic acids free from amino groups including the mono- and polycarboxylic alkanoic acids having one to 22 carbon atoms, such as acetic acid, propionic acid, capric acid, lauric acid, myristic acid, stearic acid, behenic acid, succinic acid, and adipic acid. Analogous salts capable of conversion to the analogous $N^\omega$-acylamino acids are formed with alkenoic acids such as acrylic, methacrylic, crotonic, oleic, linolic, maleic, and itaconic acid. Benzoic acid, phthalic acid, terephthalic acid are merely representative of suitable aromatic acids. Polycarboxylic acids of high molecular weight, such as polymethacrylic acid, also form suitable salts.

The desired dehydration and molecular rearrangement may be achieved by holding the salt at the indicated elevated temperature at which it is usually liquid. However, anhydrous organic solvents, such as dimethylformamide or dimethylsulfoxide may be employed for convenient temperature control since they boil in the desired temperature range. Paraffin oil may be employed as a heat transfer medium. Xylene and petroleum fractions of suitably high boiling point (above 100°C) form azeotropic mixtures with water and assist in removal of the water formed during the rearrangement. A portion of the solvent is permitted to distill off together with the water.

While the conversion of the carboxylic acid salts can be performed successfully at any temperature between 100° and 250°C, best results are normally produced at 140° to 200°C. If so desired, the salts may be heated in a closed vessel, although conversion at ambient pressure is normally feasible.

The acylated amino acids so produced may be employed directly as amphoteric surfactants, particularly if the acyl groups are hydrophobic, or their solubility in water may be increased by reaction with ethylene oxide in a known manner.

The following Examples are further illustrative of this invention.

EXAMPLE 1

34.6 g Lysine laurate was suspended in 300 ml xylene, the suspension was kept at its boiling point, and the water produced was distilled from the reaction system as an azeotropic mixture with the solvent. The calculated amount of water was collected after 3 hours, and heating was continued for 2 additional hours. The solution then was pale brown, and was permitted to cool to ambient temperature.

A crystalline precipitate formed, was filtered off, washed with 100 ml 50% ethanol and dried. It weighed 29.4 g. It was dissolved in 500 ml 3N sulfuric acid and reprecipitated in purified form by partly neutralizing the solution.

27.6 g Pure, crystalline $N^\varepsilon$-lauroyllysine melting at 230° to 232°C was obtained (84.2% yield) and identified by elementary analysis:

| | | | |
|---|---|---|---|
| Calculated for $C_{18}H_{36}O_3N_2$ | 65.81%C | 11.05%H | 8.53%N |
| Found | 65.71 | 10.76 | 8.51 |

The infrared absorption spectrum was identical with that of $N^\varepsilon$-lauroyllysine prepared by way of the copper salt of lysine, as described above, and a mixture of the two batches of $N^\varepsilon$-lauroyllysine had the same melting point as the individual batches.

For comparison purposes, a molten mixture of 14.6 g lysine and 22.0 g lauric acid was kept for 3 hours at 150° – 170°C, thereafter dissolved in 350 ml 2N aqueous sodium hydroxide solution, and the solution was acidified to pH 1 with 6N hydrochloric acid. The precipitated cyrstals were recovered by centrifuging and thoroughly washed with ethanol. The residue weighed 9.1 g and consisted of $N^\varepsilon$-lauroyllysine (m.p. 230°C). 18.0 g $N^\alpha$, $N^\varepsilon$-dilauroyllysine (m.p. 119°–120°C) was recovered from the alcoholic washing liquor.

EXAMPLE 2

20.6 g Lysine acetate was suspended in 60 g paraffin oil, and the suspension was held in a partial vacuum at 160°C for 7 hours with stirring while the water formed was removed by distillation. After cooling, the reaction mixture was poured into 300 ml cold gasoline and stirred. A crystalline precipitate formed, was recovered by filtering, thoroughly washed with distilled water, and dried. It consisted of 13.8 g $N^\epsilon$-acetyllysine (73.5% yield) melting at 250° – 253°C. It was identified by its elementary analysis:

| | | | |
|---|---|---|---|
| Calculated for $C_8H_{16}O_3N_2$ | 51.05%C | 8.57%H | 14.88%N |
| Found | 50.97 | 8.46 | 14.96 |

The infrared absorption spectrum of the product was identical with that of the compound prepared by a known method (Arch. Biochem. Biophys. 104 [1964] 231), and a mixture of the two batches had the same melting point as the individual batches.

EXAMPLE 3

25.3 g Ornithine benzoate was held in an autoclave at 180°C for four hours. The reaction mixture was dissolved in 300 ml 2N aqueous sodium hydroxide solution, and a crystalline precipitate was formed when the solution was adjusted to pH 2 with 6N hydrochloric acid. It was recovered by filtering, thoroughly washed with water, and dried. It weighed 21.0 g.

Benzoic acid was removed from the crude crystals in a Soxhlet extractor by means of low boiling gasoline. The residue consisted of 19.4 g pure, crystalline $N_\delta$-benzoylornithine (82.6% yield) melting at 258° – 260°C.

The compound was identified by elementary analysis:

| | | | |
|---|---|---|---|
| Calculated for $C_{13}H_{18}O_3N_2$ | 62.38%C | 7.25%H | 11.19%N |
| Found | 62.41 | 7.30 | 10.96 |

The compound was further identified by comparison of its infrared absorption spectrum with that of a sample prepared according to a known method (J. Biol. Chem. 183 [1950] 179) and by the melting point of a mixture with the known sample.

Analogous results were achieved by heating salts of the amino acids mentioned in Examples 1 to 3 with the saturated, unsaturated, aromatic, and polycarboxylic acids mentioned above, but not specifically illustrated in the Examples, and with the salts of the carboxylic acids with the basic amino acids mentioned in the introductory passages of this specification, but not mentioned in the Examples. More specifically, substantially identical results were achieved when lysine and ornithine were replaced in Examples 1 to 3 under otherwise unchanged conditions by $\alpha,\gamma$-diaminobutyric acid, or by the $N^\alpha$-methyl and $N^\alpha$, $N^\alpha$-dimethyl derivatives of lysine, ornithine, or $\alpha,\gamma$-diaminobutyric acid. Other carboxylic acids, more specifically, other alkanoic acids having eight to 22 carbon atoms, could be substituted in the salts for the lauric, acetic, or benzoic acid moieties described above without significantly affecting the outcome.

What is claimed is:

1. A method of preparing an $N^\omega$-acyl derivative of a basic amino acid having an $\omega$-amino group which comprises holding a salt of said basic amino acid and a carboxylic acid free from amino groups at a temperature of 100° to 250°C until water is released, and said $N^\omega$-acyl derivative is formed, acyl in said derivative being the acyl radical of said carboxylic acid.

2. A method as set forth in claim 1, wherein said carboxylic acid is an alkanoic acid having one to 22 carbon atoms, an alkenoic acid having three to 22 carbon atoms, an aromatic carboxylic acid, or an aliphatic polycarboxylic acid.

3. A method as set forth in claim 2, wherein said basic amino acid is lysine, ornithine, or $\alpha,\gamma$-diaminobutyric acid.

4. A method as set forth in claim 2, wherein said basic amino acid is an $N^\alpha$-lower-alkyl-$\alpha,\omega$-diamino acid.

5. A method as set forth in claim 1, wherein said carboxylic acid is an alkanoic or alkenoic acid having eight to 22 carbon atoms.

6. A method as set forth in claim 1, wherein a solution consisting essentially of said salt and of an organic liquid forming an azeotropic mixture with water and boiling at said temperature is held at said temperature.

7. A method as set forth in claim 6, wherein said organic liquid is xylene or a petroleum fraction.

8. A method as set forth in claim 1, wherein said salt is held in the molten state at said temperature until said derivative is formed.

9. A method as set forth in claim 1, wherein said basic amino acid is an $\alpha,\omega$-diaminoalkanoic acid or an $N^\alpha$-lower-alkyl-$\alpha,\omega$-diaminoalkanoic acid.

* * * * *